United States Patent [19]

Mizumachi et al.

[11] 4,252,611
[45] Feb. 24, 1981

[54] PRESSURE SUPPRESSION APPARATUS OF A NUCLEAR POWER PLANT

[75] Inventors: Wataru Mizumachi, Tokyo; Toshihiro Funahashi, Yokohama, both of Japan

[73] Assignee: Tokyo Shibaura Denki Kabushiki Kaisha, Kanagawa, Japan

[21] Appl. No.: 875,895

[22] Filed: Feb. 7, 1978

[30] Foreign Application Priority Data

Feb. 8, 1977 [JP] Japan .................... 52-12161

[51] Int. Cl.³ .................... G21C 9/00; G21C 13/00
[52] U.S. Cl. .................... 176/38; 176/37; 176/87; 261/124
[58] Field of Search .................... 176/37, 38; 261/123, 261/124; 239/559

[56] References Cited

U.S. PATENT DOCUMENTS

| 196,055 | 10/1877 | Talcott | 239/559 |
|---|---|---|---|
| 988,938 | 4/1911 | Stein | 261/124 |
| 1,191,097 | 7/1916 | Speirs | 261/124 |
| 1,529,688 | 3/1925 | Campbell | 261/124 |
| 1,532,233 | 4/1925 | Dahlberg | 261/121 |
| 3,432,154 | 3/1969 | Danjes | 261/124 |
| 3,605,362 | 9/1971 | Sweeney | 176/38 |
| 3,606,895 | 9/1971 | Reed | 261/124 |
| 3,606,999 | 9/1971 | Lawless | 261/124 |
| 3,808,123 | 4/1974 | Neel | 261/124 |
| 4,022,655 | 5/1977 | Gaouditz | 176/38 |

FOREIGN PATENT DOCUMENTS

| 2212761 | 3/1973 | Fed. Rep. of Germany | 176/38 |
|---|---|---|---|
| 51-60892 | 5/1976 | Japan | 176/38 |

OTHER PUBLICATIONS

Sears, Francis Weston Mechanics, Heat, and Sound, 2nd Ed. Reading, Mass.: Addison-Wesley, 1950, pp. 246 and 322.

Primary Examiner—Stephen C. Bentley
Assistant Examiner—Edward F. Miles
Attorney, Agent, or Firm—Stevens, Davis, Miller & Mosher

[57] ABSTRACT

In pressure suppression apparatus of a nuclear reactor of the type comprising a vessel surrounding a reactor pressure vessel and containing a water pool at the bottom of the vessel, and a steam exhaust pipe having one end immersed and opened in the water pool, there is provided with an exhaust chamber connected to the immersed portion of the exhaust pipe and provided with a number of discharge openings.

2 Claims, 8 Drawing Figures

F I G. 1
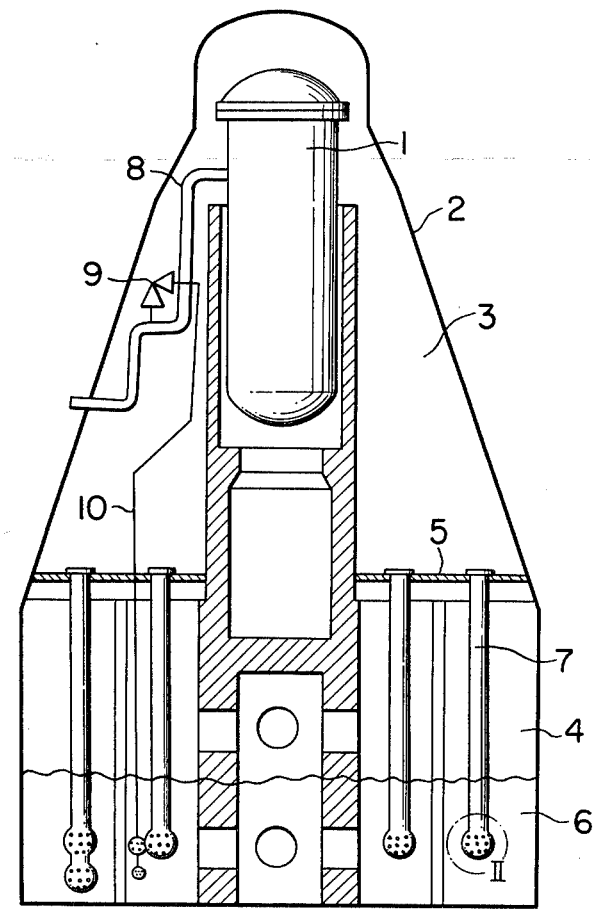
F I G. 2
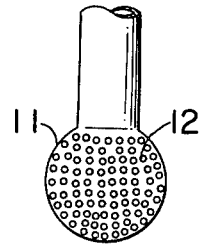

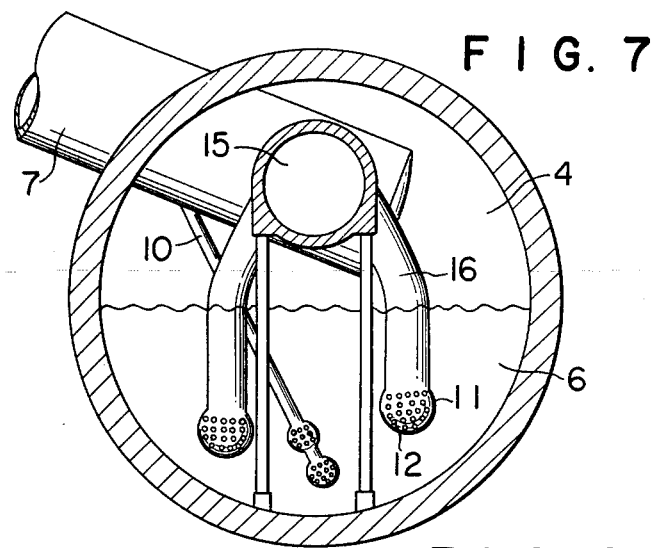
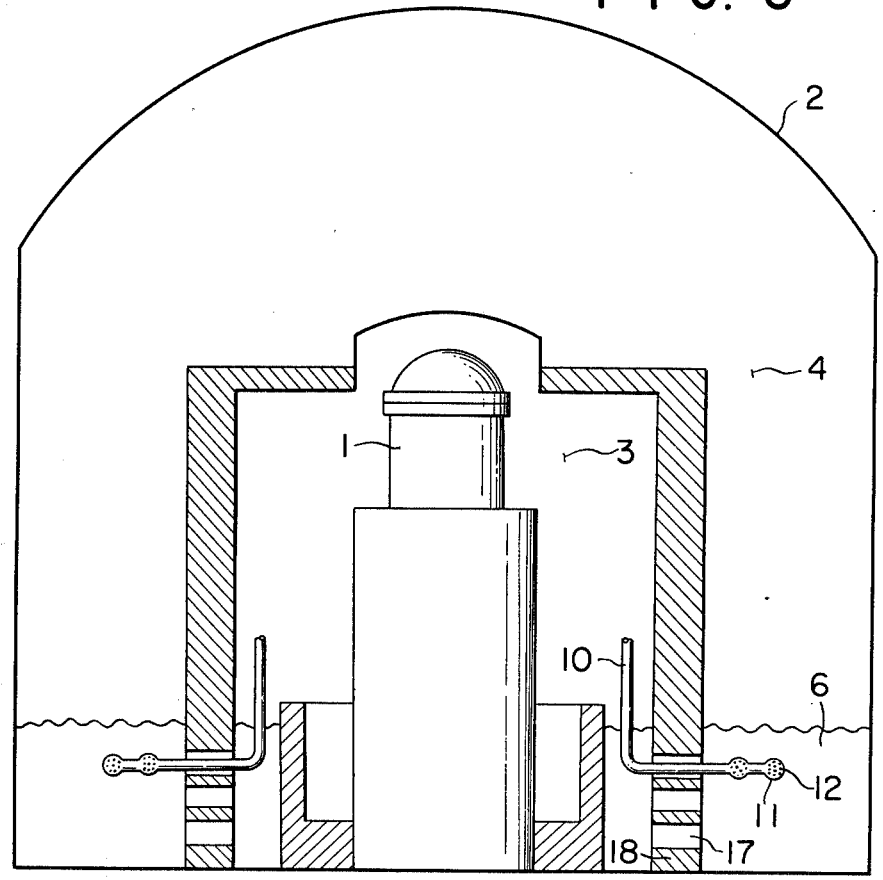

PRESSURE SUPPRESSION APPARATUS OF A NUCLEAR POWER PLANT

BACKGROUND OF THE INVENTION

This invention relates to pressure suppression apparatus of a nuclear power plant, and more particularly, pressure suppression apparatus which can operate safely a nuclear reactor by suppressing the pressure rise in a reactor containment and absorbing thermal energy uniformly in a case when a coolant is released in the reactor containment.

In a nuclear power plant, when an accident, such as loss of coolant caused by breakage of a primary cooling system of a nuclear reactor, occurs or when a safety valve is required to be opened for releasing main steam in a pressure vessel, it is required for the pressure suppression apparatus to promptly absorb, within a primary reactor containment, the thermal energy of the steam discharged from steam exhaust pipes of safety valves and exhaust pipes of a part of turbines for operating pumps of a reactor cooling system for emergency, to suppress the pressure rise in the reactor containment and to prevent the escape of steam or water in the reactor to the outside thereof. The pressure suppression apparatus further serves as a water source for the reactor cooling system in the form of a closed loop for emergency use. Thus, the pressure suppression apparatus operates for maintaining the safe operation of the nuclear power plant.

Although various types of reactor containment are different in their structures, description is made hereunder as to Mark II type reactor containment. However, the invention is also applicable to the other types of reactor containment.

The inner space of a reactor containment surrounding a reactor pressure vessel is divided by a diaphragm floor into two parts, the upper one serving as a drywell space while the lower one as a suppression chamber. A water pool is contained in the suppression chamber. A plurality of vent pipes are suspended from the diaphragm floor and one end of each vent pipe is opened in the drywell and the other end is opened in the water pool in the suppression chamber. A plurality of main steam pipes are connected to the reactor pressure vessel to feed steam to the turbine, and safety valves for releasing the main steam are provided for the respective main steam exhaust pipes. The exhaust pipes of the safety valves extend water-tightly through the diaphragm floor and are opened in the water pool of the suppression chamber. The exhaust pipe of a pump-operating turbine of an emergency reactor cooling system extends through the reactor containment and is also opened in the water pool.

It is known that a number of small openings are provided to the ends of the steam exhaust pipes immersed in the water pool and these openings are provided for the purpose that when a coolant such as steam is discharged from the pressure vessel into the water pool through vent pipes, pipes for discharging steam discharged from safety valves for releasing main steam, or exhaust pipes of the turbines, the thermal energy of the steam can be promptly absorbed by the water pool and uniformly condensed therein.

However, it has been desired to construct safely and effectively the pressure suppression apparatus by taking the following points into consideration.

(1) Usually, the exhaust pipes provided with discharge openings immersed in water pool for discharging steam are initially filled with non-condensible gas such as nitrogen gas or air. For this reason, in the case where the coolant is rapidly released into the exhaust pipes, the non-condensible gas under super-compressed condition is discharged into the water pool in the suppression chamber, and non-condensible gas layer is formed near the exhaust pipes thereby forcing upwardly the water pool. Such phenomenon is not desired for the structure of the suppression chamber.

(2) Since uniform condensation of the coolant such as steam discharged from the exhaust pipes into the water pool may induce vibration of the pipes, the coolant should be condensed uniformly in the water pool.

(3) The non-condensible gas under super-compressed condition may cause unstable oscillation, i.e., super-expansion of the gas, which would damage the wall of the suppression chamber.

SUMMARY OF THE INVENTION

Accordingly, it is an object of this invention to obviate the problems described above and to provide improved pressure suppression apparatus of a nuclear power plant capable of preventing the rising of the water pool resulting from the discharge of the non-condensible gas, preventing unstable pressure oscillation due to the discharge of the gas into the water pool and uniformly condensing the coolant such as steam in the water pool.

According to this invention, there is provided pressure suppression apparatus of a nuclear reactor of the type comprising a vessel surrounding a reactor pressure vessel and containing a water pool at the bottom of the vessel, and a steam exhaust pipe, and the apparatus further comprises an exhaust chamber connected to the immersed portion of the exhaust pipe and provided with a number of discharge openings.

BRIEF DESCRIPTION OF THE DRAWINGS

In the accompanying drawings:

FIG. 1 is a cross-sectional view of a nuclear reactor provided with pressure suppression apparatus according to this invention;

FIG. 2 is a view showing the detail of the exhaust chamber (encircled portion II shown in FIG. 1);

FIGS. 7 and 8 show modified embodiments of the pressure suppression apparatus of this invention applied to Mark I and Mark III type reactor containment, respectively.

DESCRIPTION OF THE PREFERRED EMBODIMENTS

Figure 3:
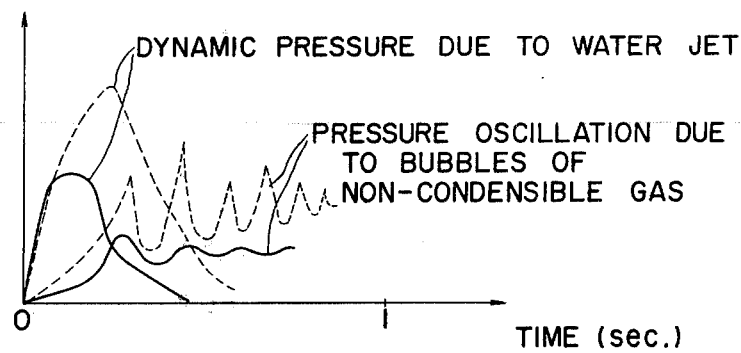
FIG. 3 is a graph showing variations with time of the dynamic pressure of water jet and pressure oscillation caused by the discharge of the non-condensible gas.

With reference to FIG. 1, the internal space of a reactor containment 2 surrounding a nuclear pressure vessel 1 is divided by a diaphragm floor 5 into two parts, the upper one being used as the space of a drywell 3 and the lower one as a suppression chamber 4. A plurality of vent pipes 7 are suspended from the diaphragm floor 5. One end of each vent pipe is opened in the drywell space 3 and the other end is opened into a water pool 6 contained in the suppression chamber 4. A plurality of main steam pipes 8 are connected to the pressure vessel 1 to transfer the steam from the vessel 1 to a turbine not shown, and a plurality of safety valves 9 for releasing main steam are provided for the respective main steam pipes 8. Exhaust pipes 10 of the safety valves 9 extend water-tightly through the diaphragm floor 5 and are opened into the water pool 6. An exhaust pipe (not shown) of a turbine for driving a pump of an emergency reactor cooling system extends through the reactor containment 2 and is also opened in the water pool 6. The respective front ends of the exhaust pipes 7 and 10 are provided with exhaust chambers 11 each having the shape of a spherical shell provided with a number of discharge openings 12 for discharging the non-condensible gas in the exhaust pipes into the water pool 6.

The operation of the pressure suppression apparatus according to this invention will be described hereunder.

When steam at high temperature and under high pressure is released into the vent pipes 7 and the exhaust pipes 10 of the safety valves 9, each pipe having one end opened into the water pool 6, the non-condensible gas filling the pipes 7 and 10 is compressed and discharged into the water pool. At this time, the non-condensible gas discharged from the pipes 7 and 10 is firstly released into the space of the exhaust chamber 11 in which the gas expands preliminarily and then discharges into the water pool 6 through a number of discharge openings 12, whereby the non-condensible gas is never rapidly discharged in the water pool and expands properly in the exhaust chamber 11, so that the extreme super compression and/or super expansion of the discharged non-condensible gas can be suppressed and unstable pressure oscillation can also be prevented.

Although the gas in the exhaust chamber 11 is then discharged into the water pool 6 through a number of openings 12, the gas is divided into a plurality of small flows by the openings. In this manner, the discharged gas does not form a gas layer in the water pool 6 near the exhaust chamber. Furthermore, after complete discharge of the non-condensible gas, the discharge openings 12 provide intimate contact between the water near the exhaust chamber 11 and the steam discharged from the openings and also provide uniform condensation of the steam. For this reason, direct impact force of the non-condensible gas or steam on the wall of the suppression chamber 4 can be prevented.

Figure 4:
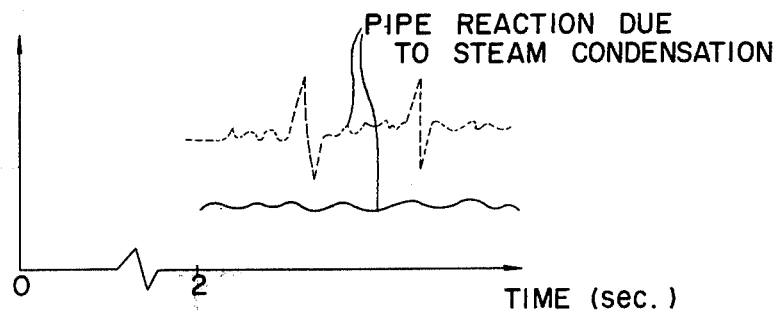
FIG. 4 is a graph showing the pipe reaction due to the condensation of steam.
Figure 5:
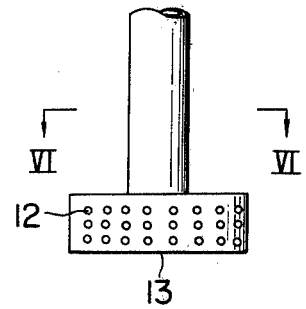
FIG. 5 is a side view showing another embodiment of the exhaust chamber of the pressure suppression apparatus of this invention.
Figure 6:
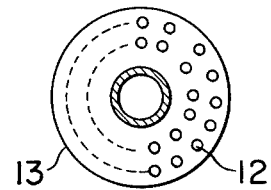
FIG. 6 is a cross-sectional view taken along the line VI—VI of FIG. 5.

These advantageous features will be explained with reference to FIGS. 3 and 4. FIG. 3 shows variations in time of the dynamic pressure of the water jet and the pressure oscillation of bubbles of the non-condensible gas in the water pool 6, and FIG. 4 shows the variation in time of the pipe reaction to the steam condensation. In these FIGS. 3 and 4, broken lines represent the variations in a conventional pressure suppression apparatus and solid lines represent that in the apparatus according to this invention. Although the dynamic pressure resulting from the water jet shows the water jet force in case of discharging static hydraulic head in the exhaust pipes, since the steam is discharged radially uniformly by the presence of the discharge openings 12 from the exhaust chamber 11 into the water pool 6, the water jet force acting upon the wall of the suppression chamber 4 is extremely reduced in comparison with the conventional pressure suppression apparatus. Furthermore, according to the present invention, since the non-condensible gas has been preliminarily expanded properly in the chamber 11, the pressure oscillation of the gas has no extreme peak and varies gently, and since the pipe reaction at the time of steam condensation is reduced, the discharged steam contacts the water pool 6 in good condition, thereby performing more excellent and uniform condensation than the conventional apparatus in which steam is directly discharged from exhaust pipes into the water pool. The steam discharge area is enlarged by providing the exhaust chamber 11 and the contact surface between the steam and the water is increased so as to condense promptly the steam discharged. The exhaust chamber is not limited to one provided with a spherical shell as shown in FIG. 2 and another one, if it is provided with inner space and a number of discharge openings, may also be replaced, for example, a cylindrical exhaust chamber 13 as shown in FIGS. 5 and 6.

The exhaust chambers 11 or 13 are provided for the vent pipes 7, the exhaust pipes 10 of the safety valves for releasing main steam, and for the exhaust pipe of a pump-operating turbine of the emergency reactor cooling system. Each of the above pipes is provided with one exhaust chamber, or with a plurality of cascade connected chambers.

It would be desired to arrange the adjacent exhaust chambers 11 or 13 at different level, for example, in zigzag arrangement in height, so as to ensure respective condensing regions thereby effecting sufficient condensation of the discharged steam. This arrangement of the exhaust chambers enables uniform condensation of the steam, eliminates appearance of the peak value of the pipe reaction shown in FIG. 4 and reduces the stress level thereof.

FIG. 7 shows another embodiment of the pressure suppression apparatus applied to Mark I type reactor containment. A doughnut-shaped suppression chamber 4 is disposed at the lower portion of the exterior of this type reactor containment, and the chamber 4 is partially filled with water 6. The chamber 4 is communicated with the reactor containment through vent pipes 7. The vent pipes 7 open in the space within the reactor containment and connected to a vent header 15 located in the upper space of the chamber 4. A plurality of downcomers 16 are suspended from the vent header 15 and the ends of the downcomers respectively provided with exhaust chambers 11 are immersed in the water pool 6. Each exhaust chamber 11 is provided with a number of discharge openings 12. Similar exhaust chambers 11 are also connected to the ends of the exhaust pipes, such as, pipes of the safety valves and an exhaust pipe of a pump-operating turbine of an emergency reactor cooling system.

With the embodiment shown in FIG. 7, at the time of discharging the static hydraulic head in the exhaust pipes, since a small amount of steam is discharged from each opening 12, water jet force is weakened, and at the discharge of the steam, since the steam is dispersed by and discharged from the discharge openings 12, the non-condensible gas in the exhaust pipes is bubbled and does not form a gas layer in the water pool. Furthermore, the contacting area of the discharged steam to the water pool 6 is increased and the steam is promptly and uniformly condensed. At the time of the discharge of the non-condensible gas, as described above, since the gas is preliminarily expanded in the space of the exhaust chamber 11, the super compression and super swelling of the gas in the water pool are prevented and the pressure oscillation thereof can be reduced.

FIG. 8 shows the other embodiment of the pressure suppression apparatus according to this invention as applied to Mark III type reactor containment. This embodiment does not include vent pipes 7 shown in FIG. 1 and vent pipes 7, a vent header 15 and downcomers 16 shown in FIG. 7, but includes horizontal communication openings 17 which correspond in operation to the above described pipes or members. The communication openings 17 are disposed at a portion of the wall 18 of the drywell 3 under the water level of the water pool, and possess a rigidity higher than that of vent pipes 7. Therefore, the exhaust chamber 11, in this embodiment, is provided only for the ends of the exhaust pipes 10 of the safety valves for releasing main steam and the exhaust pipes of the pump-operating turbine of the emergency reactor cooling system.

With the pressure suppression apparatus shown in FIG. 8, the same advantages as those of the apparatus shown in FIGS. 1 and 7 can also be obtained.

The advantages obtainable by the pressure suppression apparatus of this invention will be summarized as follows.

Uniform and prompt condensation of the discharged steam is achieved by disposing the exhaust chambers at the front ends of the steam exhaust pipes, said exhaust chambers being provided with discharge openings opening in the water pool. Thus, the provision of the exhaust chamber provided with a number of openings permits the preliminary expansion of the non-condensible gas in the space of the chamber at the time of discharging the gas, thereby preventing the formation of any gas layer in the water pool and reducing the amplitude of the pressure oscillation, and the water jet force is also reduced at the time of discharging the steam from the exhaust pipes. For this reason, any objective force which affects the steam exhaust pipes, the suppression chamber and the other internal structures can be reduced or substantially eliminated. Thus, the whole structure of the nuclear reactor is safely maintained and operated, so that in some cases supporting members of the reactor may be simplified.

Further, it is to be understood by those skilled in the art that the foregoing description refers to preferred embodiments of this invention and that various modifications and changes can be made without departing from the true scope and spirit of the invention as defined in the appended claims.

We claim:

1. In a pressure suppression apparatus of a nuclear reactor of the type comprising a reactor containment surrounding a reactor pressure vessel and containing a water pool at the bottom of the containment, a plurality of steam exhaust pipes each having one end immersed in said water pool, and an exhaust chamber connected to the immersed portion of each said steam exhaust pipe, the improvement in which each said exhaust chamber is a spherical member having an inner diameter larger than that of said exhaust pipe and provided with a number of discharge openings through the entire peripheral surface thereof, said exhaust chambers of the said exhaust pipes being located at different levels in said water pool, so that water, air and steam are successively exhausted from said exhaust chambers in all directions through said openings at different levels thereby decreasing the pressure of the exhausted air against the wall of said containment.

2. The pressure suppression apparatus according to claim 1 wherein at least one of said steam exhaust pipes is provided with a plurality of said exhaust chambers in cascade at the immersed portion of said steam exhaust pipe.

* * * * *